| (12) | United States Patent | (10) Patent No.: | US 10,227,895 B2 |
|---|---|---|---|
| | Farah | (45) Date of Patent: | Mar. 12, 2019 |

(54) GAS TURBINE CASE AND REINFORCEMENT STRUT FOR SAME

(71) Applicant: PRATT & WHITNEY CANADA CORP., Longueuil (CA)

(72) Inventor: Assaf Farah, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 855 days.

(21) Appl. No.: 14/135,651

(22) Filed: Dec. 20, 2013

(65) Prior Publication Data

US 2015/0176432 A1 Jun. 25, 2015

(51) Int. Cl.
  *F01D 25/24* (2006.01)
  *F02C 7/04* (2006.01)

(52) U.S. Cl.
  CPC ............... *F01D 25/24* (2013.01); *F02C 7/04* (2013.01); *F05D 2260/941* (2013.01); *Y10T 29/49233* (2015.01)

(58) Field of Classification Search
  CPC .. F05D 2260/94; F05D 2260/941; F02K 3/02; Y10T 29/49233
  See application file for complete search history.

(56) References Cited

U.S. PATENT DOCUMENTS

| 3,351,319 | A | * | 11/1967 | Frost | ....................... | F01D 5/022 |
|---|---|---|---|---|---|---|
| | | | | | | 415/208.2 |
| 3,398,535 | A | * | 8/1968 | Hemsworth | ............ | B64D 27/18 |
| | | | | | | 415/142 |
| 6,561,760 | B2 | * | 5/2003 | Wadia | ..................... | F01D 25/02 |
| | | | | | | 415/145 |
| 7,121,806 | B2 | * | 10/2006 | Smith | .................... | B23K 31/02 |
| | | | | | | 416/213 R |
| 7,797,922 | B2 | | 9/2010 | Eleftheriou | | |
| 8,408,011 | B2 | * | 4/2013 | Fontaine | ............... | F01D 25/162 |
| | | | | | | 228/101 |
| 2010/0275614 | A1 | | 11/2010 | Fontaine | | |
| 2011/0073745 | A1 | * | 3/2011 | Duchatelle | ............... | F01D 9/04 |
| | | | | | | 248/637 |

* cited by examiner

*Primary Examiner* — Ninh H. Nguyen
*Assistant Examiner* — Jason G Davis
(74) *Attorney, Agent, or Firm* — Norton Rose Fulbright Canada LLP

(57) ABSTRACT

A case assembly for a gas turbine engine comprising annular case components each having a central axis. Radial struts each have a radial axis and intersect the annular case components. A stress dissipation mass projecting from a continuous surface of at least one of the struts at the intersection with a corresponding annular case component, the stress dissipation mass being on either side of a plane passing through the radial axis of the strut and the central axis of the corresponding annular case component. A method for dissipating thermal and mechanical stresses on a strut in a case assembly for a gas turbine engine is also provided.

15 Claims, 5 Drawing Sheets

FIG_4

GAS TURBINE CASE AND REINFORCEMENT STRUT FOR SAME

TECHNICAL FIELD

The present application relates to a gas turbine engine and to a case therefore.

BACKGROUND OF THE ART

Turbofan engines typically have a case assembly with a fan case, an intermediate case, a compressor case, a gas generator case, a turbine case and a turbine exhaust case about a centreline. The hot section of the engine, including the gas generator case, the turbine case and turbine exhaust case, are typically made of steel or nickel alloys. The cooler sections such as the intermediate case and the compressor case may be made of lighter materials such as aluminium or magnesium. However, steel is conventionally used for the fan case because of its strength.

In the intermediate case, there is a compressor air passage, and a bypass air passage, defined by an annular splitter. The splitter extends forward of radial struts integrated between the intermediate case and the fan case. The intermediate case with the splitter and the struts is generally integrally cast and then machined. The parts are of uniform material thickness resulting in above limit stresses in certain locations.

Low cycle fatigue is a persistent problem which can reduce the useful life of various structural components due to cycling between idling and operating conditions and thus subjected to stresses generated by thermal expansion effects and mechanical loads. Due to the high loads experienced on intermediate case designs, low cycle fatigue locations are especially noted on all struts. Increasing the mass to compensate increases the thermal stresses, while decreasing mass increases the g loading and thrust contribution.

Improvement in case design is desired.

SUMMARY

In one aspect, the present disclosure provides a case assembly for a gas turbine engine comprising: annular case components each having a central axis; radial struts each having a radial axis, the radial struts intersecting the annular case components; and a stress dissipation mass projecting from a continuous surface of at least one of the struts at the intersection with a corresponding annular case component, the stress dissipation mass being on either side of a plane passing through the radial axis of the strut and the central axis of the corresponding annular case component.

In another aspect, the present disclosure provides a method for dissipating thermal and mechanical stresses on a strut in a case assembly for a gas turbine engine comprising: determining a location of substantial thermal and mechanical stresses, determining a volume of mass required to dissipate the thermal and mechanical stresses at the location, and forming a discrete mass on the strut protruding from a continuous surface of the strut, at the determined location on either side of the strut.

In yet another aspect, the present disclosure provides a gas turbine engine comprising: a case assembly of an annular case components each having a central axis; radial struts in the case assembly, each having a radial axis, the radial struts intersecting the annular case components; and a stress dissipation mass projecting from a continuous surface of at least one of the struts at the intersection with a corresponding annular case component, the stress dissipation mass being on either side of a plane passing through the radial axis of the strut and the central axis of the corresponding annular case component.

Further details of these and other aspects of the present invention will be apparent from the detailed description and figures included below.

DESCRIPTION OF THE DRAWINGS

Reference is now made to the accompanying figures depicting embodiments of the present invention, in which.

DETAILED DESCRIPTION

Figure 1:
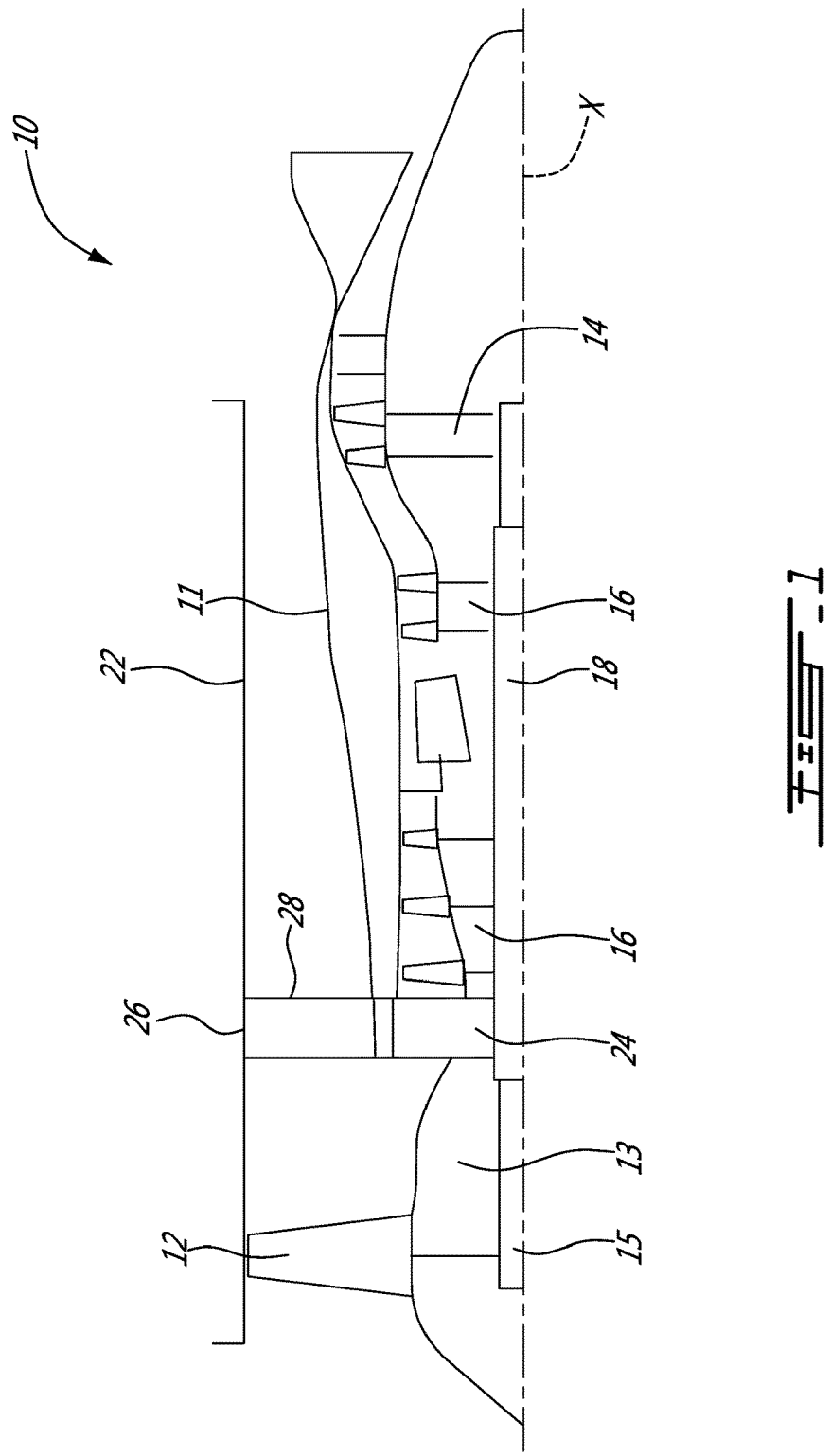
FIG. 1 is a schematic cross-sectional view of a turbofan gas turbine engine.

Referring to FIG. 1, a turbofan gas turbine engine which is an exemplary application of the described subject matter includes an engine outer case 10, a core case 11, a low pressure spool assembly (not indicated) which includes a fan assembly 12, a low pressure compressor assembly 13 and a low pressure turbine assembly 14 connected by a shaft 15, and a high pressure spool assembly (not indicated) which includes a high pressure compressor assembly 16 and a high pressure turbine assembly 17 connected by a turbine shaft 18. The core case 11 surrounds the low and high pressure spool assemblies to define a main fluid path (not numbered) therethrough. The high and low pressure spool assemblies co-axially define a rotational engine axis X of the engine 10.

It should be noted that the terms "radial", "axial" and "circumferential" used throughout this specification and appended claims, unless otherwise specified, are with respect to the engine axis X.

Figure 2:
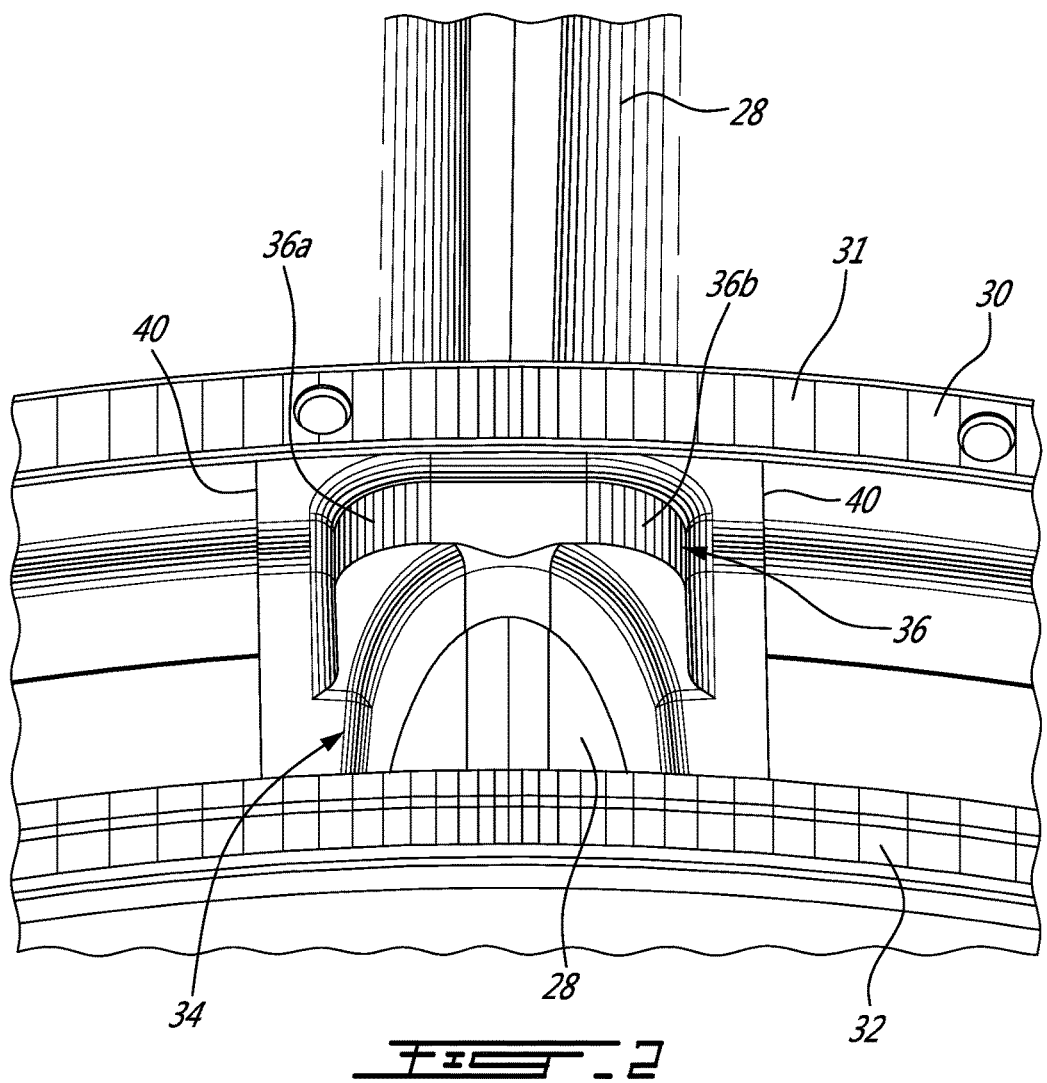
FIG. 2 is a fragmentary perspective view of a strut and splitter assembly with a detail in accordance with an embodiment.

As shown concurrently in FIGS. 1 and 2, an intermediate case 22 is illustrated having an inner hub 24 and an outer ring 26. The inner hub 24 may be mounted onto the turbine shaft 18 to support the turbine shaft 18 when it rotates. The intermediate case 22 may be immediately downstream of the fan case surrounding fan 12 as shown in FIG. 1. A plurality of struts 28 extend from the inner hub 24 to the outer ring 26.

Splitter ring 30 separates the bypass air flow from the flow entering the compressor section (FIG. 1), with the flow entering the compressor section being radially inward of the bypass air flow. The splitter ring 30 is supported by the struts 28, and may have a gaspath baffle 31. A support ring 32 may also be connected to the struts 28 (e.g., welded) between the inner hub 24 and the splitter ring 30, and may be used to support a bleed-off valve, among other possibilities.

Figure 3:
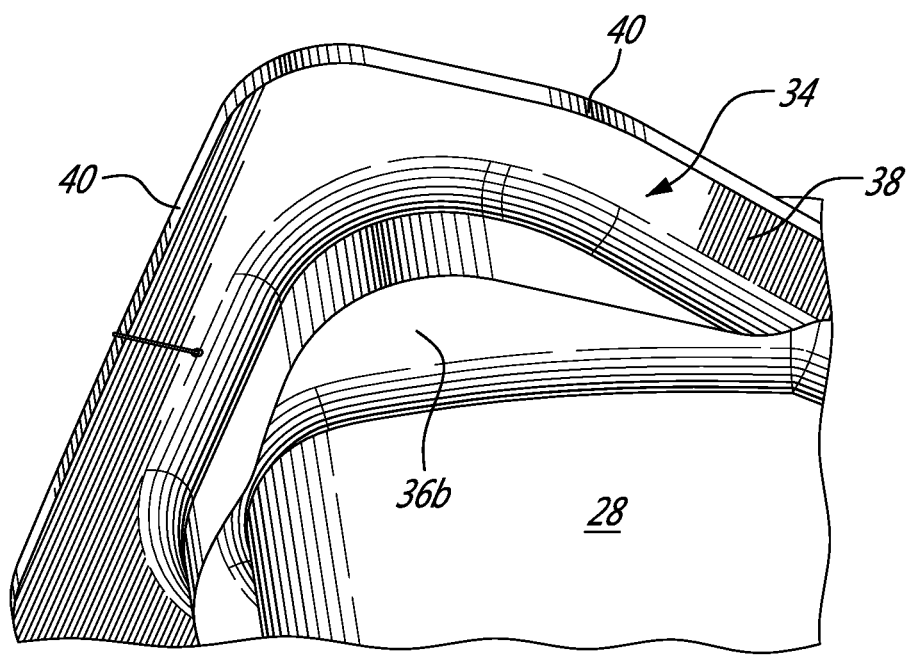
FIG. 3 is a fragmentary, enlarged perspective view of the detail shown in FIG. 2.

Referring now to FIGS. 2 and 3, a stress dissipating mass 36 (i.e., stress distribution mass) is positioned at the joint 34 between one of the struts 28 and the splitter ring 30, which joint 34 typically comprises a fillet. The stress dissipating mass 36 is formed by a pair of bulges 36a, 36b (a.k.a., lobes), placed symmetrically, one on either side of a plane extending in the radial axis of the strut 28 and the longitudinal axis of the inner hub 24 (i.e., the engine axis X). The bulges 36a, 36b mirror geometries, although they may not be mirror images of one another as well. According to an embodiment, the stress dissipating mass 36 may be machined from the stock forming the strut 28, or may have other constructions as well. As shown in FIG. 3, the strut 28 may comprise a flange-like portion 38 to contact the splitter ring 30, with the bulges 36a and 36b at the junction between the main radial portion of the strut 28 and the flange-like portion 38. The flange-like portion 38 of the strut 28 may be welded to the splitter ring 30 along weld lines 40, among other possibilities. The distance between the bulges 36a, 36b and the weld line 40 is established to avoid the weld bead being close to the bulge radius.

The bulges geometry may be proportional to the strut leading edge fillet radius, to spread the load in front of the strut 28. The minimum width (in the tangential direction, also referred to as length) may be equivalent to the strut leading edge fillet radius. The lobe width should not exceed 2 times the strut fillet radius. Larger lobes will add weight to the part without any further stress reduction.

In the embodiment in which there is no welded joint in front of the strut 28 (e.g., weld line 40), the bulges 36a, 36b may be longer. A suitable maximum length may be one time the strut leading edge fillet radius.

In an embodiment, the bulges 36a, 36b are not in the gas path, as they are underneath the gaspath baffle 31 to avoid disturbing the gas flow. Hence, the height of the bulges 36a, 36b may be smaller than a height of the baffle 31. Stated differently, the bulges 36a, 36b are used to spread the load in front of the strut 28. The load and thus the stress was concentrated in the strut leading edge area. The stress dissipating mass 36 redistributes the load without adding extra thickness all over the splitter ring 30 and thus without adding excessive weight.

Figure 4:
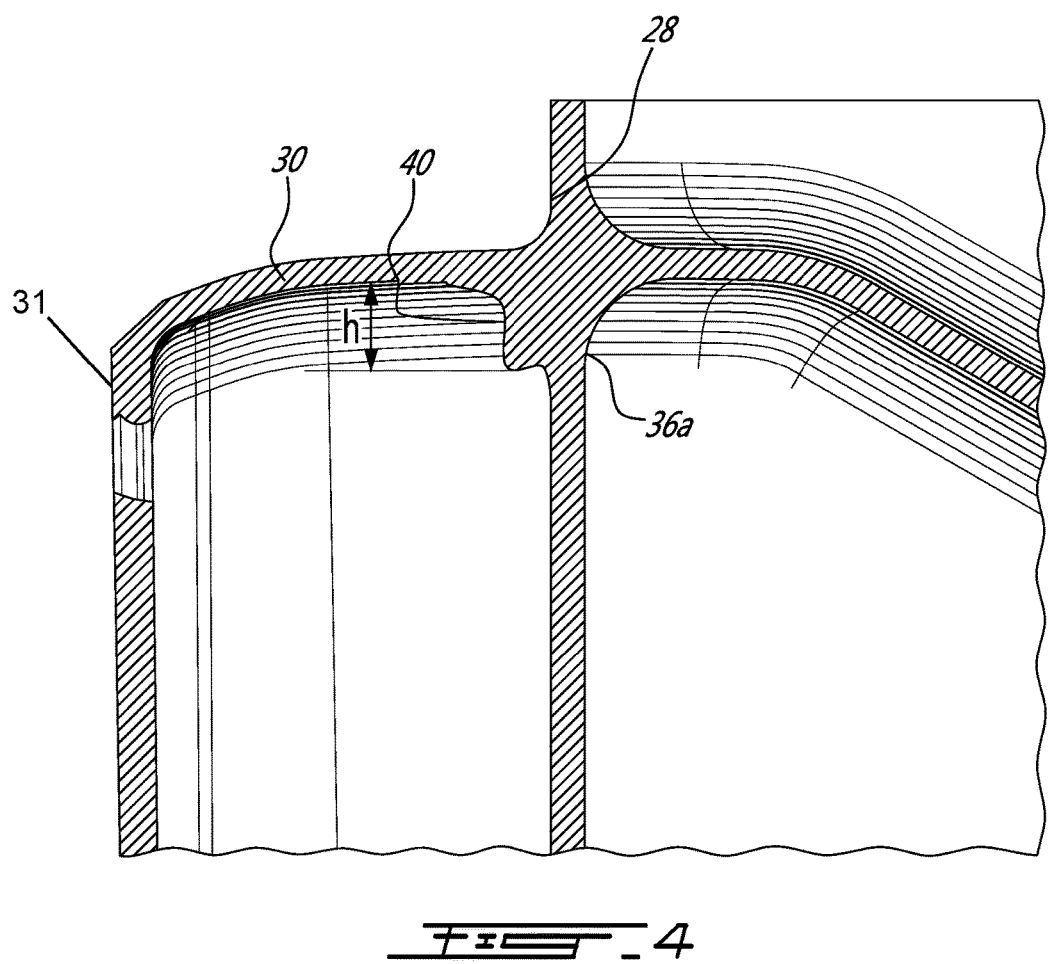
FIG. 4 is a schematic view showing a bulge size in the presence of a weldline for the detail of FIG. 2.

Referring to FIG. 4, one of the bulges 36a is shown being about 0.150 in away from the weld line 40 to avoid having double stress concentration (the distance being given as an example). The bulge 36a has a height h that may be about 3 times the ring thickness to have significant stiffness change to transfer the stress away from the leading edge of the strut 28.

Figure 5:
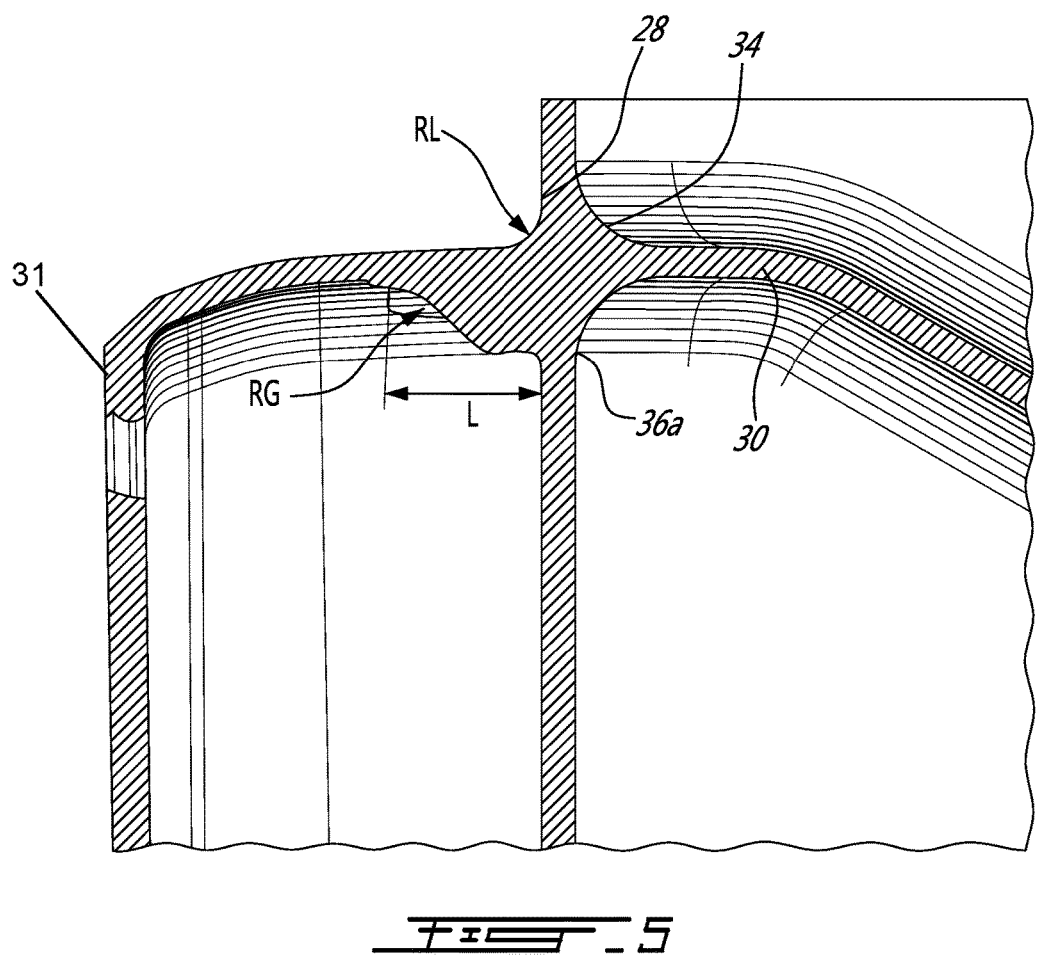
FIG. 5 is a schematic view showing a bulge size in the absence of a weldline for the detail of FIG. 2.

Referring to FIG. 5, an exemplary embodiment is shown in which there is no weld line at the junction between strut 28 and splitter ring 30. In such a case, the length L of bulge 36a may be increased, for instance up to about 3 times the strut leading edge fillet radius RL. Also, the radius RG of the bulge 36a may be increased to reduce the stress concentration The discretely selected, increased mass from the bulges 36a, 36b dissipates the thermal and mechanical stresses at the joint of the strut 28 and the splitter ring 30, without adding significant weight to the assembly. The location of the stress dissipating mass 36 at the junction between the strut 28 and the splitter ring 30 may stiffen the overall carcass from bending. Moreover, the junction between the strut 28 and the splitter ring 30 may be a critical location in terms of fatigue, whereby the stress dissipating mass 36 strengthens the junction. It is contemplated that the stress dissipating mass 36 be applied in other case sections, for instance the exhaust case 20. The stress dissipation mass 36 may be defined as a protuberance on the surface of the strut 28, which would otherwise be a generally continuous and arcuate junction between two generally planar surface. The stress dissipating mass 36 is radially inward oriented relative to the splitter ring 30. Due to its location and relatively low profile, the stress dissipating mass 36 does not have a significant impact on gas flow.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A case assembly for a gas turbine engine comprising:
   annular case components each having a central axis, the annular case components including a splitter ring between a hub annular case component and an outer ring annular case component;
   radial struts each having a radial axis, the radial struts intersecting the annular case components, a continuous and arcuate fillet projecting from a first portion of a continuous surface of at least one of the radial struts at an intersection with the splitter ring; and
   a stress dissipation mass projecting from a second portion of the continuous surface in the at least one of the radial struts such that the stress dissipation mass is adjacent to the arcuate fillet, the stress dissipation mass being located at a leading portion of the at least one of the radial struts at the intersection with the splitter ring, the stress dissipation mass being on either side of a plane passing through the radial axis of the strut and the central axis of the annular case components, the stress dissipation mass being oriented radially inward of the splitter ring, the stress dissipation mass being a protuberance projecting from the fillet along the splitter ring at said leading portion, the stress dissipation mass sized and shaped such that the stress dissipation mass transfers thermal and mechanical stresses away from the leading portion, the splitter ring having a baffle at a leading end thereof, an edge of the baffle extending beyond the stress dissipation mass in a radially inward direction.

2. The case assembly as defined in claim 1, wherein the stress dissipation mass and the strut are concurrently integrally machined from stock material of the strut.

3. The case assembly as defined in claim 1, wherein the gas turbine engine is a turbofan engine having a fan case, an intermediate case downstream of the fan case, and wherein the annular case components are part of the intermediate case.

4. The case assembly as defined in claim 1, wherein the strut has a flange that is welded along weld lines to the annular case component and the stress dissipation mass is spaced from the weld lines.

5. The case assembly as defined in claim 1, wherein the stress dissipating mass has a pair of bulges on opposite sides of the plane, the bulges being symmetrical.

6. The case assembly as defined in claim 1, comprising a fillet radius RL at the intersection between the radial struts and the annular case component featuring the stress dissipation mass, and wherein a length of the stress dissipation mass on either side of the struts is between RL and 2RL.

7. The case assembly as defined in claim 1, wherein the stress dissipation mass is monolithic with the strut.

8. The case assembly as defined in claim 1, wherein the intersection between the splitter ring and the leading portion of the at least one of the radial struts includes a fillet oriented radially outward of the splitter ring, the protuberance having a height taken along a radial direction relative to the central axis and a length taken along an axial direction relative to the central axis, the height and/or the length greater than that of the fillet.

9. A gas turbine engine comprising:
a case assembly having annular case components each having a central axis, the annular case components including a splitter ring between a hub annular case component and an outer ring annular case component,
radial struts in the case assembly, each having a radial axis, the radial struts intersecting the annular case components, a continuous and arcuate fillet projecting from a first portion of a continuous surface of at least one of the radial struts at an intersection with the splitter ring, and
a stress dissipation mass projecting from a second portion of the continuous surface in the at least one of the radial struts such that the stress dissipation mass is adjacent to the arcuate fillet, the stress dissipation mass being located at a leading portion of the at least one of the radial struts at the intersection with the splitter ring, the stress dissipation mass being on either side of a plane passing through the radial axis of the strut and the central axis of the annular case components, the stress dissipation mass being oriented radially inward of the splitter ring, the stress dissipation mass being a protuberance projecting from the fillet along the splitter ring at said leading portion, the stress dissipation mass sized and shaped such that the stress dissipation mass transfers thermal and mechanical stresses away from the leading portion, the splitter ring having a baffle at a leading end thereof, an edge of the baffle extending beyond the stress dissipation mass in a radially inward direction.

10. The gas turbine engine as defined in claim 9, wherein the stress dissipation mass and the strut are concurrently integrally machined from stock material of the strut.

11. The gas turbine engine as defined in claim 9, wherein the strut has a flange that is welded along weld lines to the annular case component and the stress dissipation mass is spaced from the weld lines.

12. The gas turbine engine as defined in claim 9, wherein the stress dissipation mass has a pair of bulges on opposite sides of the plane, the bulges being symmetrical.

13. The gas turbine engine as defined in claim 9, comprising a fillet radius RL at the intersection between the radial struts and the annular case component featuring the stress dissipation mass, and wherein a length of the mass on either side of the struts is between RL and 2RL.

14. The gas turbine engine as defined in claim 9, wherein the stress dissipation mass is monolithic with the strut.

15. The gas turbine engine as defined in claim 9, wherein the intersection between the splitter ring and the at least one of the radial struts includes a fillet oriented radially outward of the splitter ring, the protuberance having a height taken along a radial direction relative to the central axis and a length taken along an axial direction relative to the central axis, the height and/or the length greater than that of the fillet.

* * * * *